May 6, 1941.  R. E. PARIS  2,240,667
CARD CONTROLLED MACHINE
Filed July 15, 1936   11 Sheets-Sheet 1
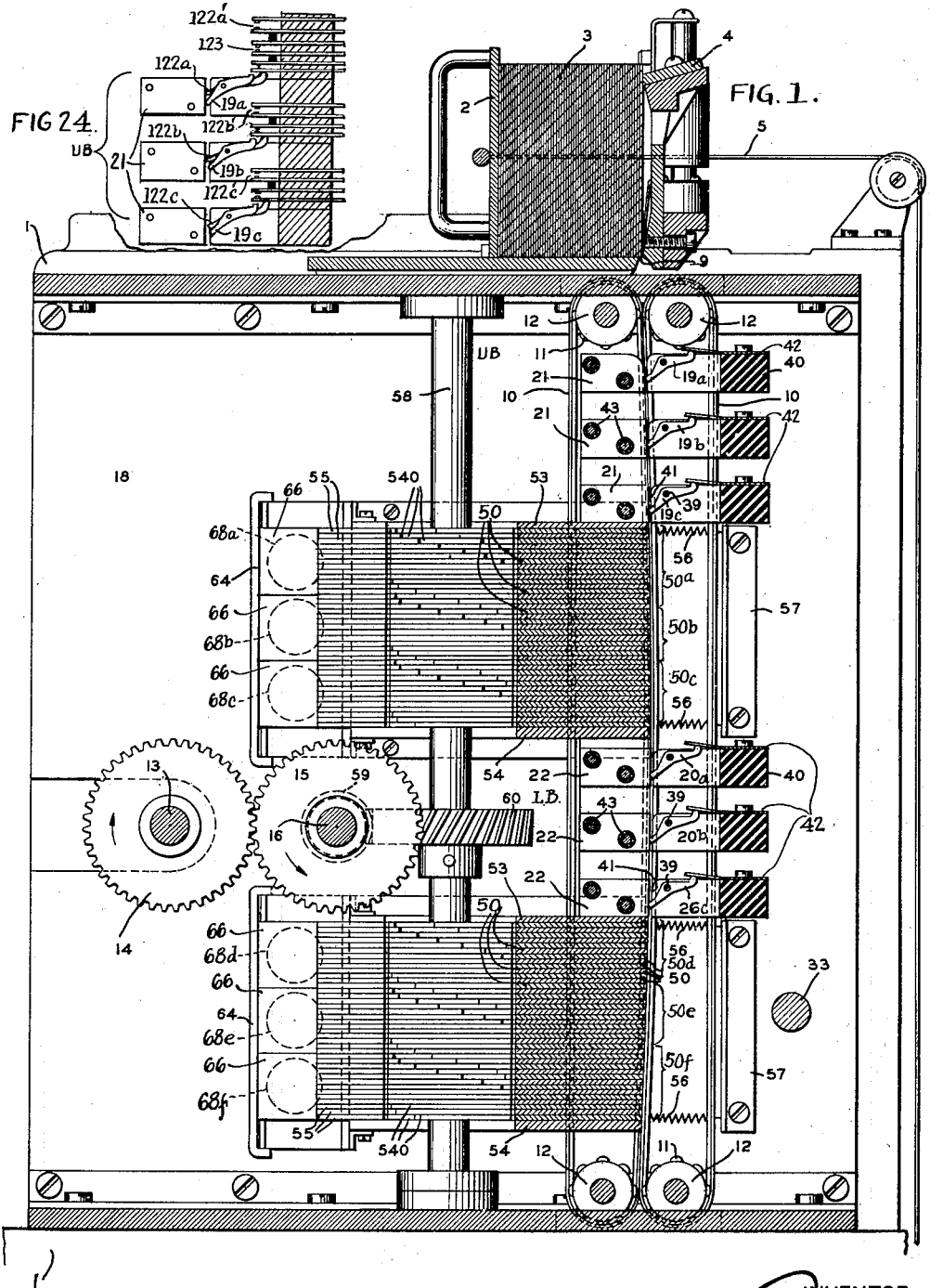
INVENTOR

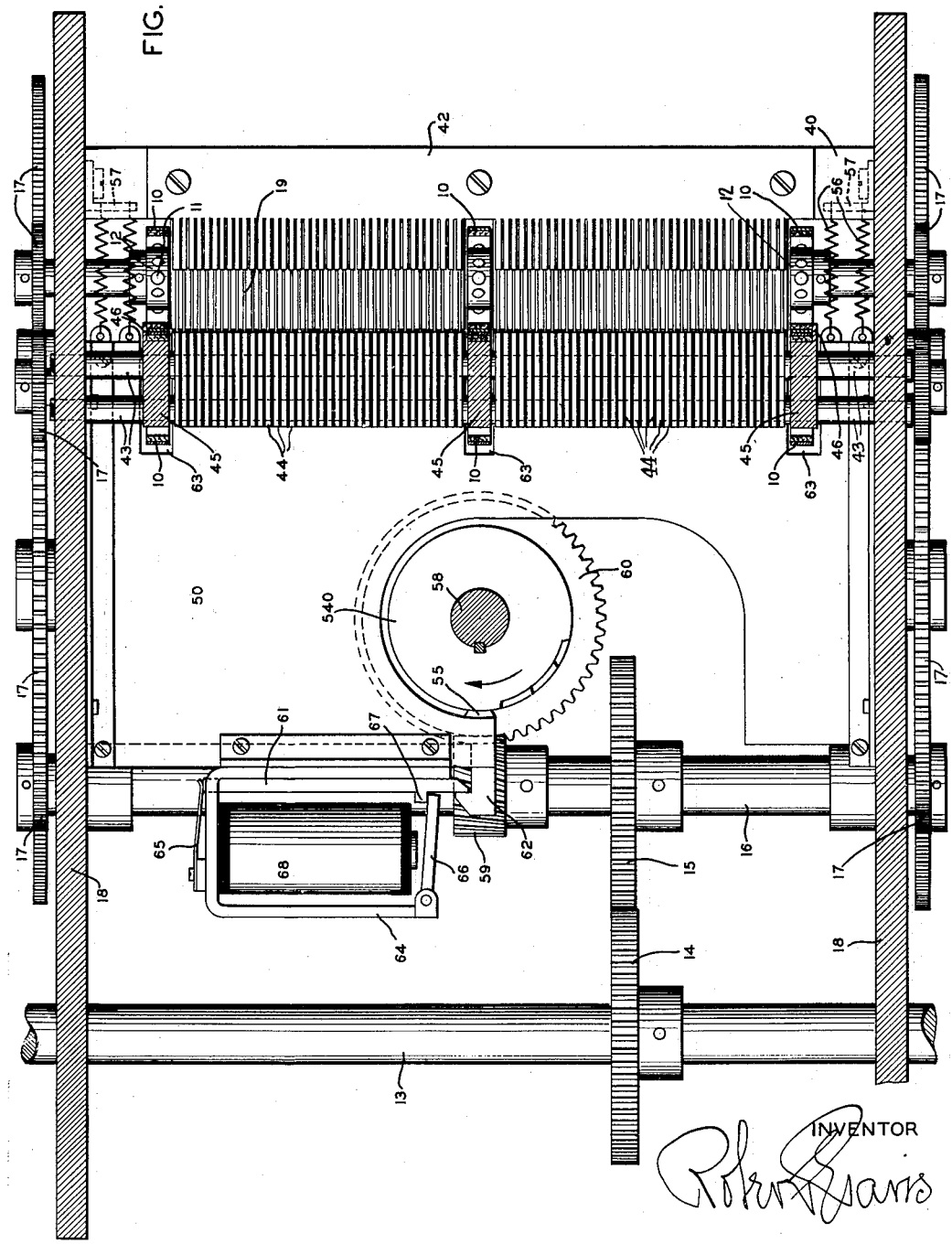

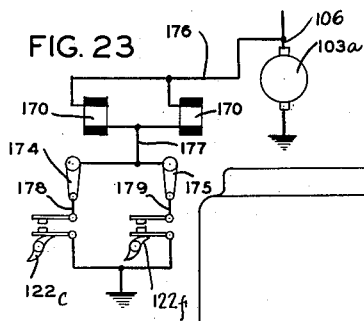
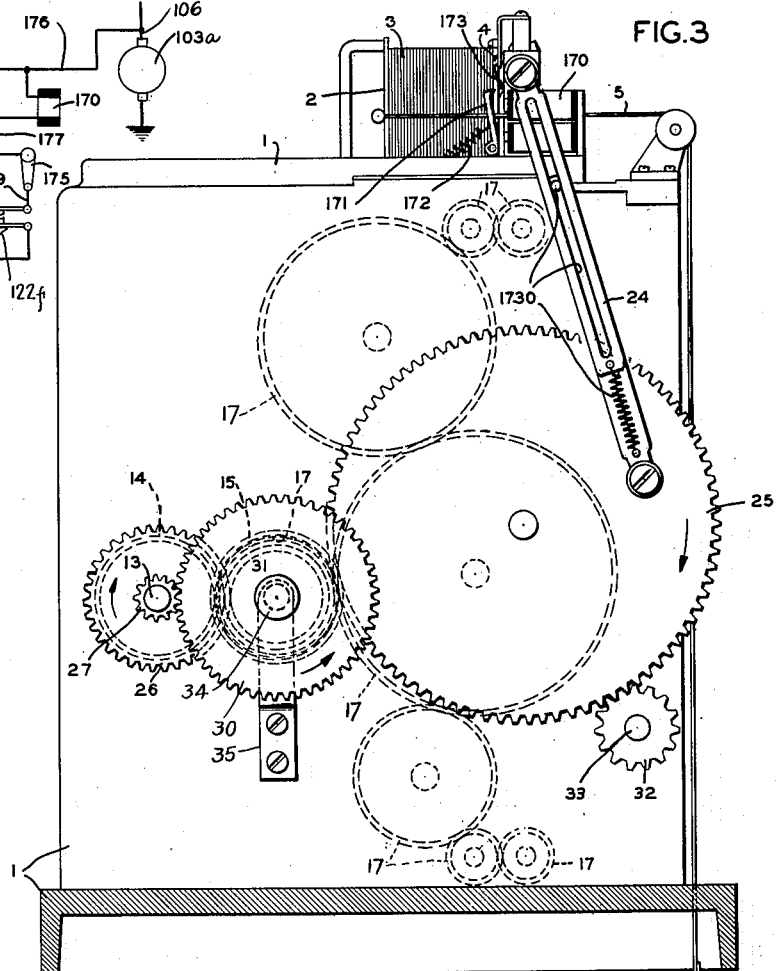
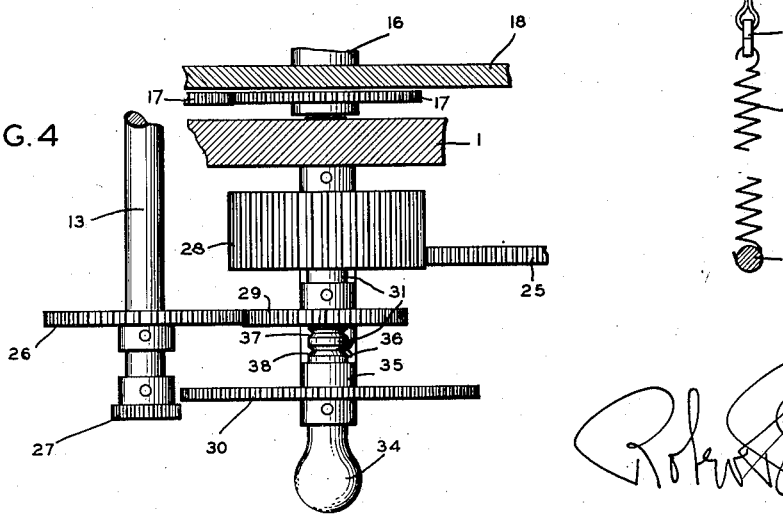

May 6, 1941.  R. E. PARIS  2,240,667
CARD CONTROLLED MACHINE
Filed July 15, 1936      11 Sheets-Sheet 4

INVENTOR
Robert E. Paris

May 6, 1941.   R. E. PARIS   2,240,667
CARD CONTROLLED MACHINE
Filed July 15, 1936   11 Sheets-Sheet 5
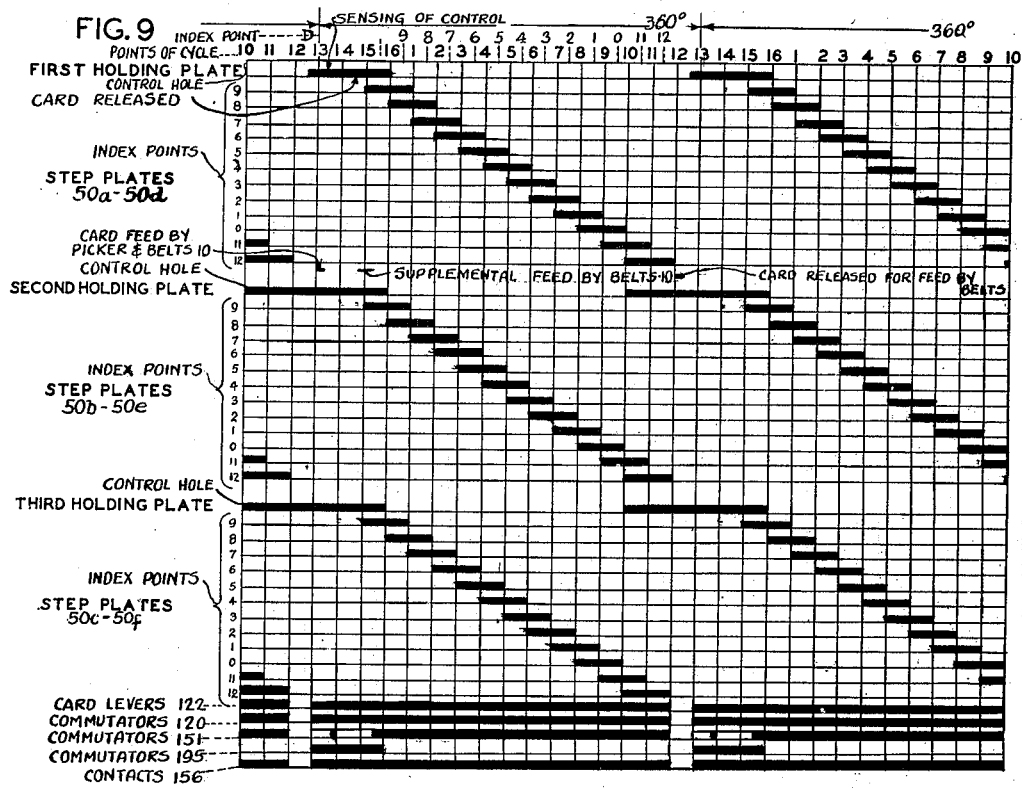
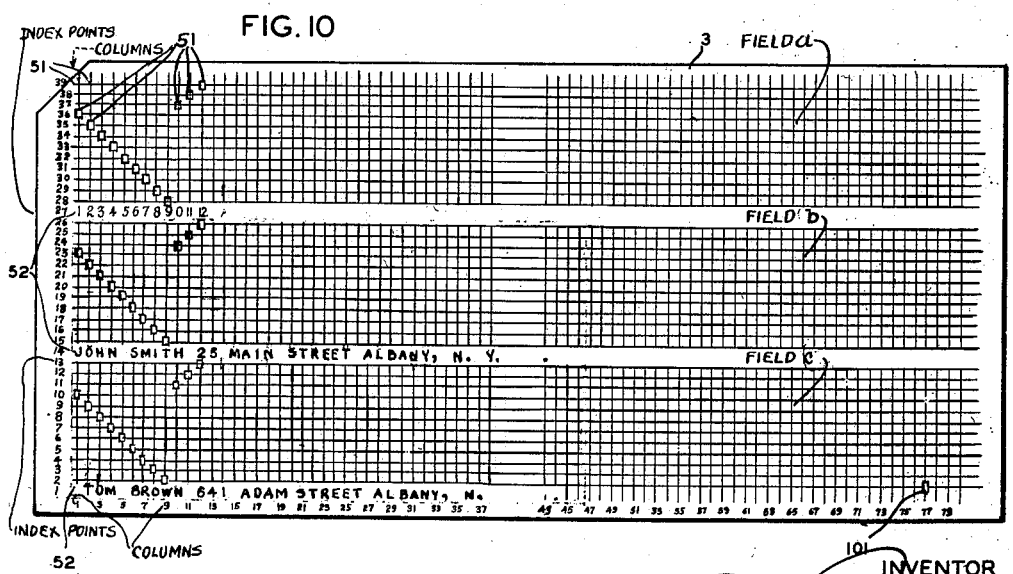

May 6, 1941.  R. E. PARIS  2,240,667
CARD CONTROLLED MACHINE
Filed July 15, 1936   11 Sheets-Sheet 6

INVENTOR
R. E. Paris

May 6, 1941.  R. E. PARIS  2,240,667
CARD CONTROLLED MACHINE
Filed July 15, 1936  11 Sheets-Sheet 7

INVENTOR

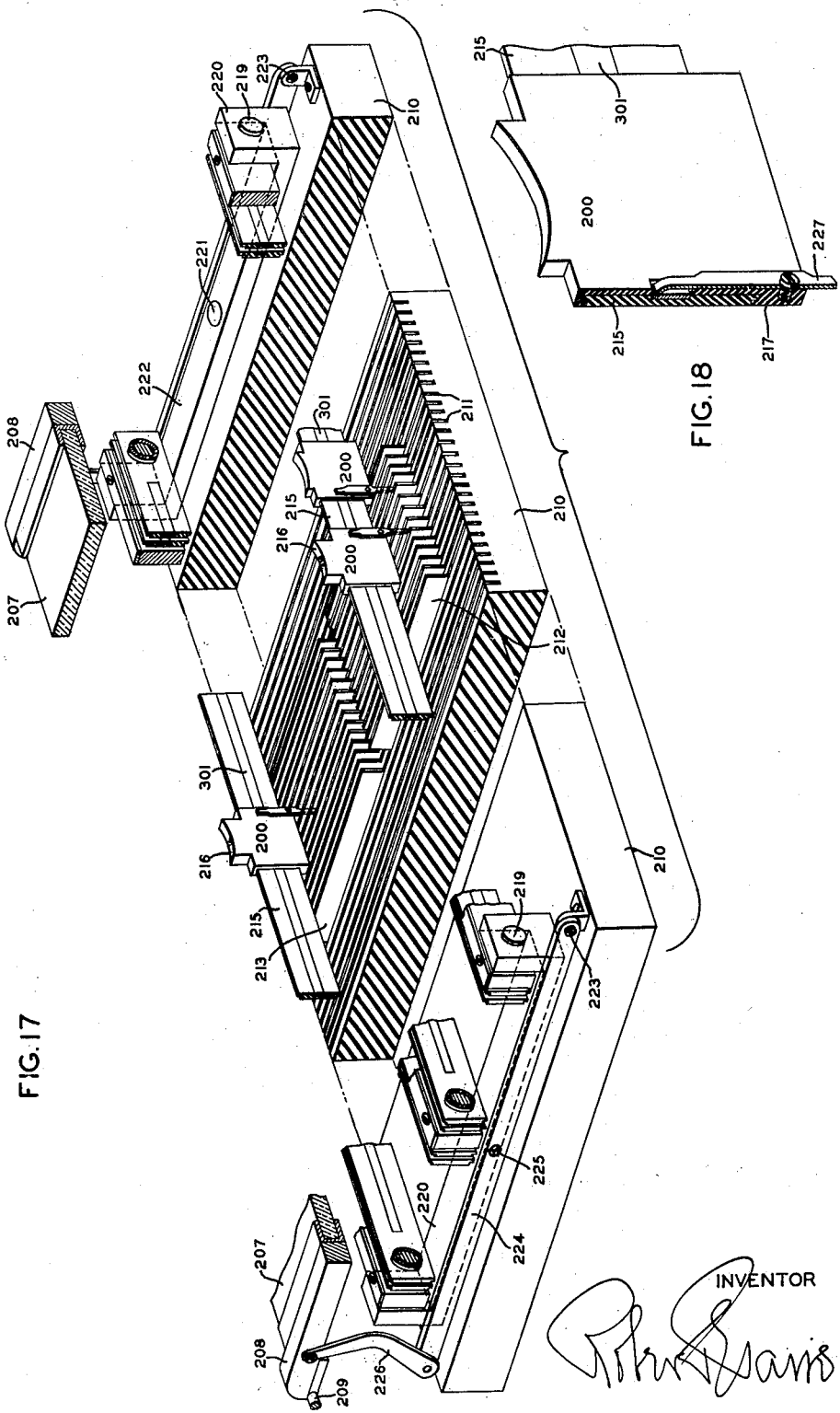

May 6, 1941.  R. E. PARIS  2,240,667
CARD CONTROLLED MACHINE
Filed July 15, 1936  11 Sheets-Sheet 9

INVENTOR

May 6, 1941.  R. E. PARIS  2,240,667
CARD CONTROLLED MACHINE
Filed July 15, 1936   11 Sheets-Sheet 10

INVENTOR

Patented May 6, 1941

2,240,667

UNITED STATES PATENT OFFICE 2,240,667

CARD CONTROLLED MACHINE

Robert E. Paris, New York, N. Y., assignor to International Business Machines Corporation, New York, N. Y., a corporation of New York Application July 15, 1936, Serial No. 90,696

16 Claims. (Cl. 235—61.6)

This invention relates to improvements in card controlled machines. One object is to provide a card feeding and controlling means which will keep the cards under perfect control and will accurately position them for sensing. In card controlled machines such as the Hollerith machines which use electric sensing means, it is now standard practice to feed the cards through heavy pressure rollers. It is impractical to use lateral guides for the cards while they are held by the rollers and if the cards are not fed accurately to the rollers, or if the rollers have not equal pressure, or due to other possible conditions, the cards will not be fed straight. To provide for this condition, a certain latitude must be allowed in the width of the perforations. It is standard practice, also, to sense the cards in motion and the perforations must have sufficient length to enable proper electric contact to be made. The present invention permits the use of much smaller perforations because the cards are fed by friction devices such as slip rollers or slip conveyor belts through a card chamber which has not only front and rear guiding surfaces, but also side guides which accurately position the cards laterally. The cards are stopped for each successive sensing position by plates which accurately position them vertically and which permit realignment of a card incorrectly fed. The stopping of the cards for each sensing position provides the necessary time interval for making proper and dependable electric contact and this permits the use of much smaller perforations.

Another object is to provide a card with smaller perforations to gain greater capacity. While this invention was originally designed for use with the Paris punctured cards described in U. S. Patent No. 1,916,232, it can be used for low tension contact sensing. The smaller perforations make it practical to do without separating walls between adjacent perforations in the same vertical column.

Another object is to provide means for holding a card in the sensing chamber for more than one machine cycle.

Another object is to provide means for recording or printing two or more lines in a tabulator from one card.

Another object is to provide means for controlling the selection of certain lines or data from each card for sensing.

Another object is to permit the use of a plurality of sensing chambers for tabulating as well as control.

Another object is to provide means for varying the number of cards fed during one or more machine cycles.

Another object is to provide a curved card chamber which, by giving the card a slight arc in travel, greatly increases the strength of the card during feeding operations, and its ability to resist crumpling and rippling.

Another object is to provide means for automatic control of variable card feeding.

Another object is to provide a means for sensing separate, horizontal recording fields on a card, either simultaneously or separately, or consecutively.

Another object is to provide means for accumulating in different accumulators and printing in different columns by presenting the perforations in a card to sensing means selected by control perforations.

Another object is to provide means for utilizing a plurality of rows of electric sensing means in one card chamber.

Another object is to provide means for connecting a plurality of sensing devices for sensing a plurality of fields of a cycle card to one accumulator and printing bank, and to disconnect therefrom one or more of said devices under card control.

Another object is to provide a switchboard such as described in my Patent No. 2,063,118, dated December 8, 1936, with proper and adequate construction.

Another object is to provide the switchboard with convenient means for setting up and clearing.

Another object is to provide means under card control for selection of a desired card field.

Other objects will appear from the following detailed description, and appended claims. One form of device for carrying my invention into effect is illustrated in the accompanying drawings, in which:

Fig. 1 is a side view of the card feed and sensing means.

Fig. 2 is a top view of the card feed and sensing means.

Fig. 3 is a side view showing the driving means for the card feed.

Fig. 4 is a plan view of the change speed mechanism for the card feed.

Fig. 9 is a timing chart.

Fig. 10 is a card with data and control perforations.

Fig. 17 is a partial perspective view of the switchboard.

Fig. 18 is a slider.

Fig. 23 is the wiring diagram for the variable card feeding device.

Fig. 24 is a diagrammatic view showing the relationship between the card levers and sensing contacts for one sensing chamber.

The card feed

Figure 6:
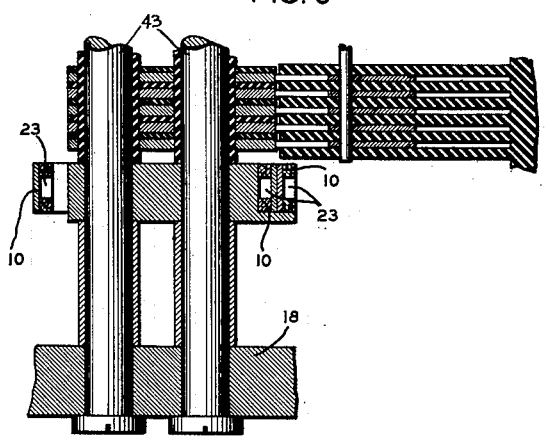
Fig. 6 is an enlarged sectional view of the sensing contactors and contact blocks.
Figure 8:
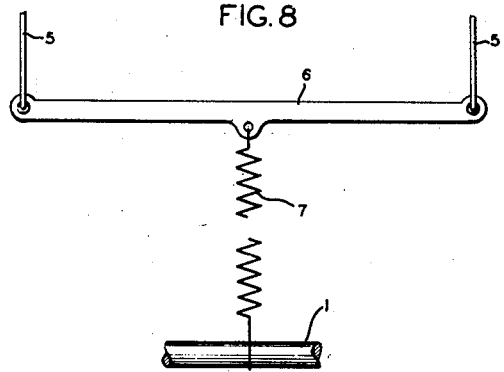
Fig. 8 is a pressure equalizing device for the card feed plate.

In Fig. 1, 1 represents the frame of a Hollerith tabulator such as now in general commercial use. A model of this invention has been built into the 3E model of the Hollerith tabulator which is represented by a series of U. S. patents; for illustrative purposes reference is herein made to the tabulating machine disclosed in U. S. Patent No. 1,976,617. 2 represents the card feed plate which pushes the cards 3 into the part of a vertically reciprocating picker knife 4. The card feed plate is pressed against the cards by cables 5, Figs. 1, 3 and 8, one on each side of the plate, fastened to respective ends of an equalizing member 6. A spring 7 exerts a pull between the center of member 6 and the tabulator frame 1, Fig. 8. Cards 3, Fig. 1, are fed one at a time through the throat 9 by the picker knife 4 into the grip of a friction feed device. This friction feed device may consist of slip rollers or, as shown in the present instance, slip conveyor belts. Three pairs of conveyor belts 10, Figs. 1, 2, and 6 may be made of leather with a spring steel facing; holes 23, Fig. 6, in the belts fit over knobs 11 on upper and lower rollers 12. These rollers are positively driven from the main drive shaft 13, Figs. 1, 2, and 3, by means of gear 14, gear 15, shaft 16, and train of gears 17. This drive shaft 13 is identical with drive shaft 13 shown in Fig. 2 and described in line 111 et seq. of page 2 in U. S. Patent No. 1,976,617. Shaft 16 and train of gears 17 are mounted on a sub-frame 18 (Fig. 2) secured to frame 1 of the machine. While the machine is in operation, rollers 12 advance the belts 10 so that the adjacent sides of each pair of belts grip a card presented by the picker knife 4 through the throat 9 and carry it downwards into successive proper positions for sensing by the several series of sensing contacts designated 19 and 20 and their subscripts, and the coacting series of contactors 21 and 22. The cards are ejected into a magazine which is well known and not shown in this disclosure. Proper pressure between coacting belts to insure even traction on the cards may be obtained with springs or by conducting the belts over slightly arcuate guides as shown herein.

The picker knife 4 is reciprocated by means of arms 24, Fig. 3, one on each side of the picker knife, attached to gears 25, which are rotated by gears 26, 27, Figs. 3 and 4, on main shaft 13 through the change speed gears 28, 29 and 30 on sub shaft 31, Fig. 4. These shafts and gears are supported on the tabulator frame 1. The pair of gears 25 are interconnected by gears 32, Fig. 3, mounted on and fastened to shaft 33. The ratio of cards fed to machine cycles can be altered by manipulating the knob 34 fastened to shaft 31, which is supported in bearings in frame 1 and bracket 35, to engage either gears 26 and 29 or 27 and 30. The shaft 31 is held in either position by spring detent 36 positioning in notch 37 or 38. Broad faced gear 28 is constantly in mesh with one gear 25. The present disclosure shows two pre-set ratios of card feed, i. e.: one card per machine cycle, and one card per each six machine cycles may be obtained under manual control. It is obvious that more and varying ratios may be added. Besides this, variable card feeding means under automatic card control are provided for as described below.

Card sensing contacts

Figure 22:
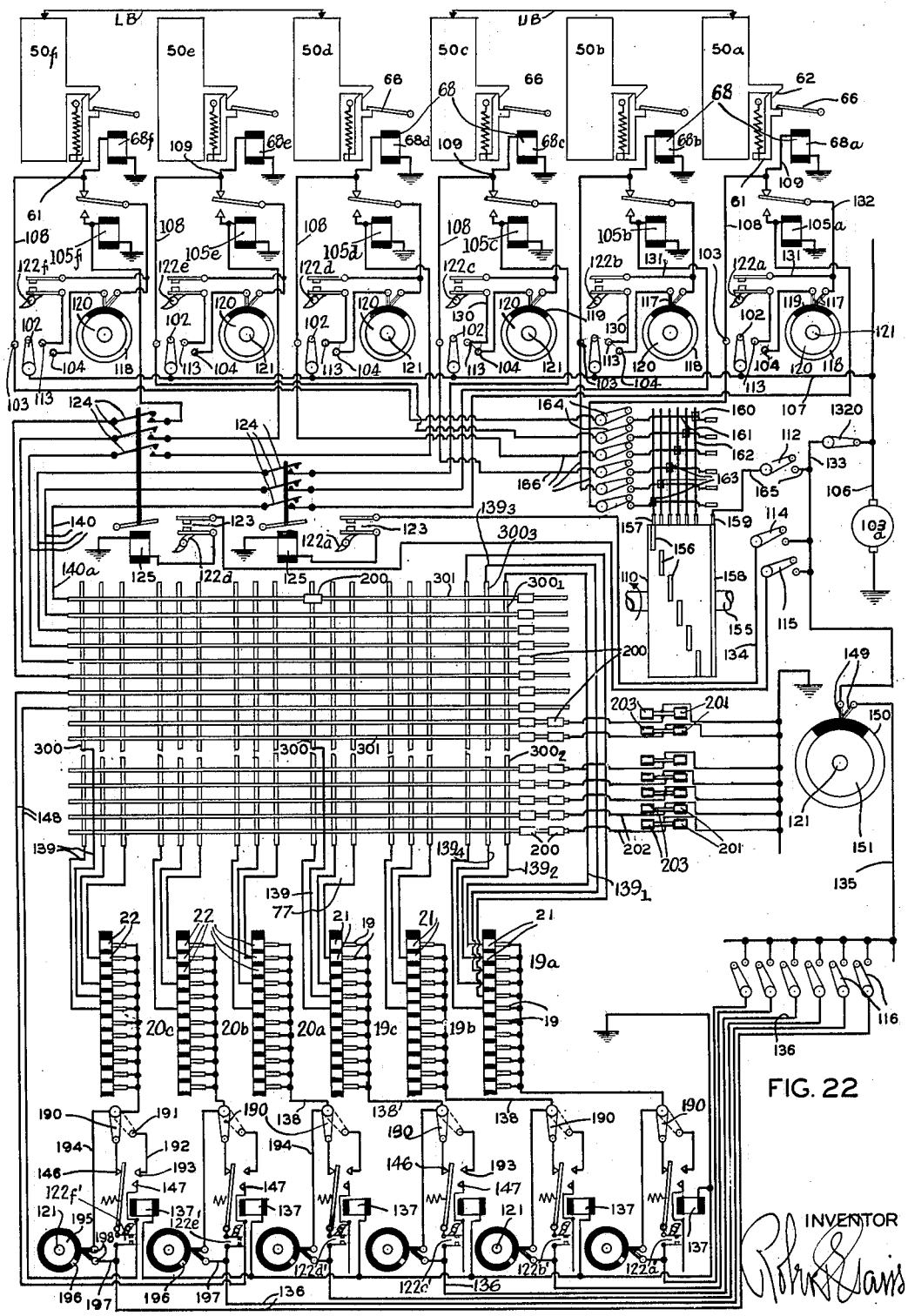
Fig. 22 is the wiring diagram for the switchboard and card feed control.

The perforations in the cards are sensed by series or brushes or electric sensing contacts 19, 20 with their subscripts designating special rows and series of electric contactors 21, 22, Figs. 1, 2 and 22. U. S. Patent No. 1,976,617 discloses a tabulator with two sensing chambers, an upper and a lower, so that two cards may be sensed simultaneously for purposes of comparison. It shows also a single row of brushes UB, LB in each sensing chamber adapted to sense a card, Fig. 10, with but a single field of data perforations from top to bottom. In this disclosure there is shown a card with three horizontal recording fields, Fig. 10, designated as "Field $a$, Field $b$ and Field $c$" which may be sensed simultaneously during one machine cycle or separately by the sensing contacts 19 or 20 having a related subscript. As shown in Fig. 1, upper and lower sensing chambers UB and LB are provided which correspond to the upper and lower sensing chamber of U. S. Patent No. 1,976,617, and are used for the comparison of two cards as well as for tabulating and control of special devices in the tabulator. Three series of sensing contacts 19 or 20 and contactors 21, 22, respectively are provided in each sensing chamber, one series of contacts and contactors being provided for each horizontal field on the card, so that two or more fields may be sensed during the same machine cycle. The sensing contacts are pivotally supported on rods 39, Fig. 1, supported in blocks of insulated material 40 fastened at each end to sub frame 18 (see Fig. 2). Blocks 40, which form part of the card chamber 41, have their inner edges slotted, each slot acting as a guide for a sensing contact 19, 20. Each sensing contact has its inner end pressed into the card chamber and against its coacting contactor 21, 22 by a comb spring 42 (Figs. 1 and 2) which serves, also, as a common electric lead to the sensing contacts. Each contactor 21, 22 has an individual electric lead 139 (Fig. 22) attached to it. Contactors 21, 22 separated by insulating plates 44, Fig. 2, are mounted on transverse insulated rods 43 fastened to sub frame 18, Figs. 2 and 6. Rods 43 also pass through and support belt guides 45, Fig. 2, one for each of the inner belts 10. These guides serve to give the belts a slightly curved path of travel and also to form part of the card chamber. They extend from the top edge of the upper series of contactors 21, 22 vertically down to the lower supporting plate 54, Fig. 1. The two outer belt guides are formed with a lip 46, Fig. 2, extending from top to bottom of the guide, which serves as a lateral guide for the card during its travel through the card chamber.

The switchboard

The switchboard is a convenient and compact means for making electric connections between certain columns of the sensing means and the control and operating means, (in this disclosure, between the contactors 21 and 22, and accumulator control magnets 201, printer control magnets 203, selective magnets 137, relays 105 and any other machine controls necessary to the operation of a tabulator).

Figure 11:
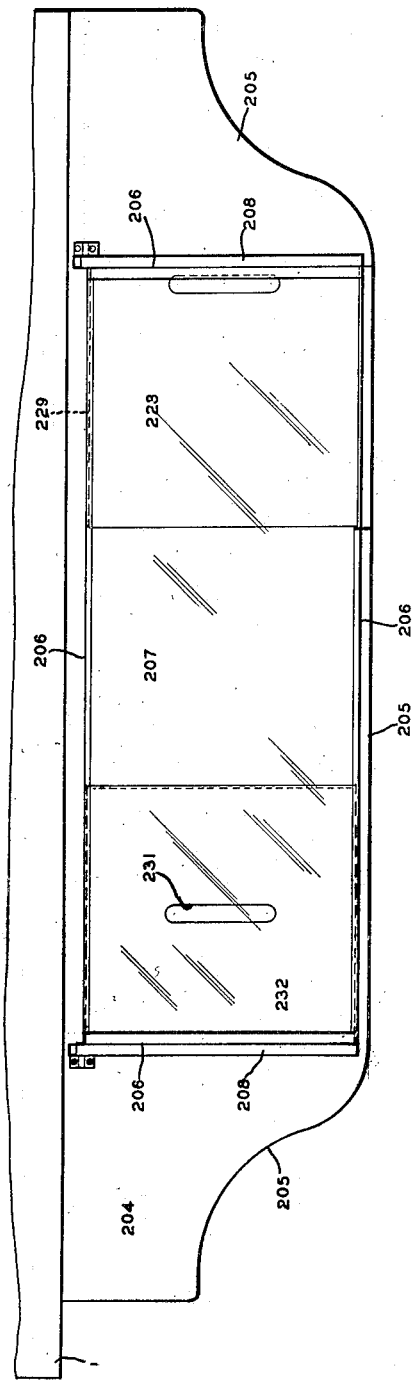
Fig. 11 is a top view of the switchboard.
Figure 12:
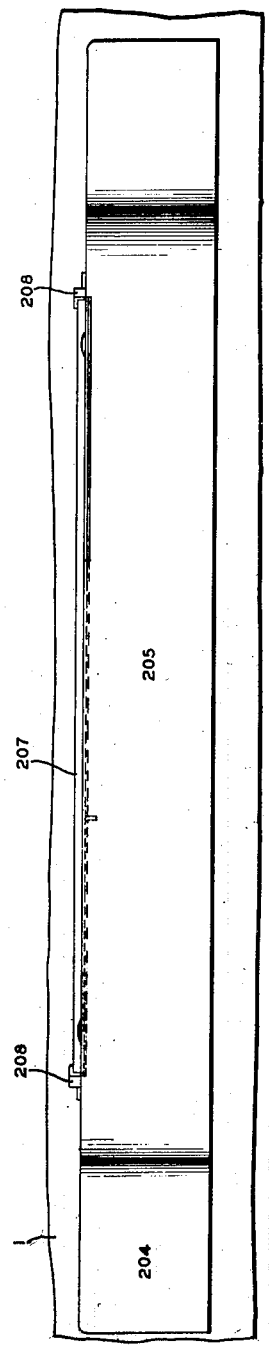
Fig. 12 is a front view of the switchboard.

As previously stated the present improvement is shown in connection with the type of machine disclosed in the U. S. Patent No. 1,976,617 and said patent discloses in Fig. 11 a printing mechanism including printer control magnets 223 corresponding to printer control magnets 203 herein. There is also disclosed in Fig. 20 of said patent an accumulating mechanism including control magnets 77 corresponding to accumulator control magnets 201 herein. Therefore, impulses directed to magnets 201 and 203 will control a printing and accumulating mechanism of the type shown in the aforesaid patent.

The switchboard is originally described in my Patent No. 2,063,118, dated December 8, 1936. The present invention includes improvements in construction and novel means for setting up connections. Referring to Figs. 11, 12, 20 and 21, 1 is the tabulator frame to which is secured the switchboard frame 204, which may be a casting in the shape of a shallow box (see Fig. 20) with a flat bottom, a flat side to be bolted to the tabulator frame, a curved front 205, and a flat top in which is a rectangular opening 206 (see Fig. 11) occupying most of the area of the top. Into this box like structure are fitted the lower and upper conductors with their sliders, means for raising and lowering the upper conductors, and means for setting the sliders and means for bringing them back to inoperative position.

Figure 19:
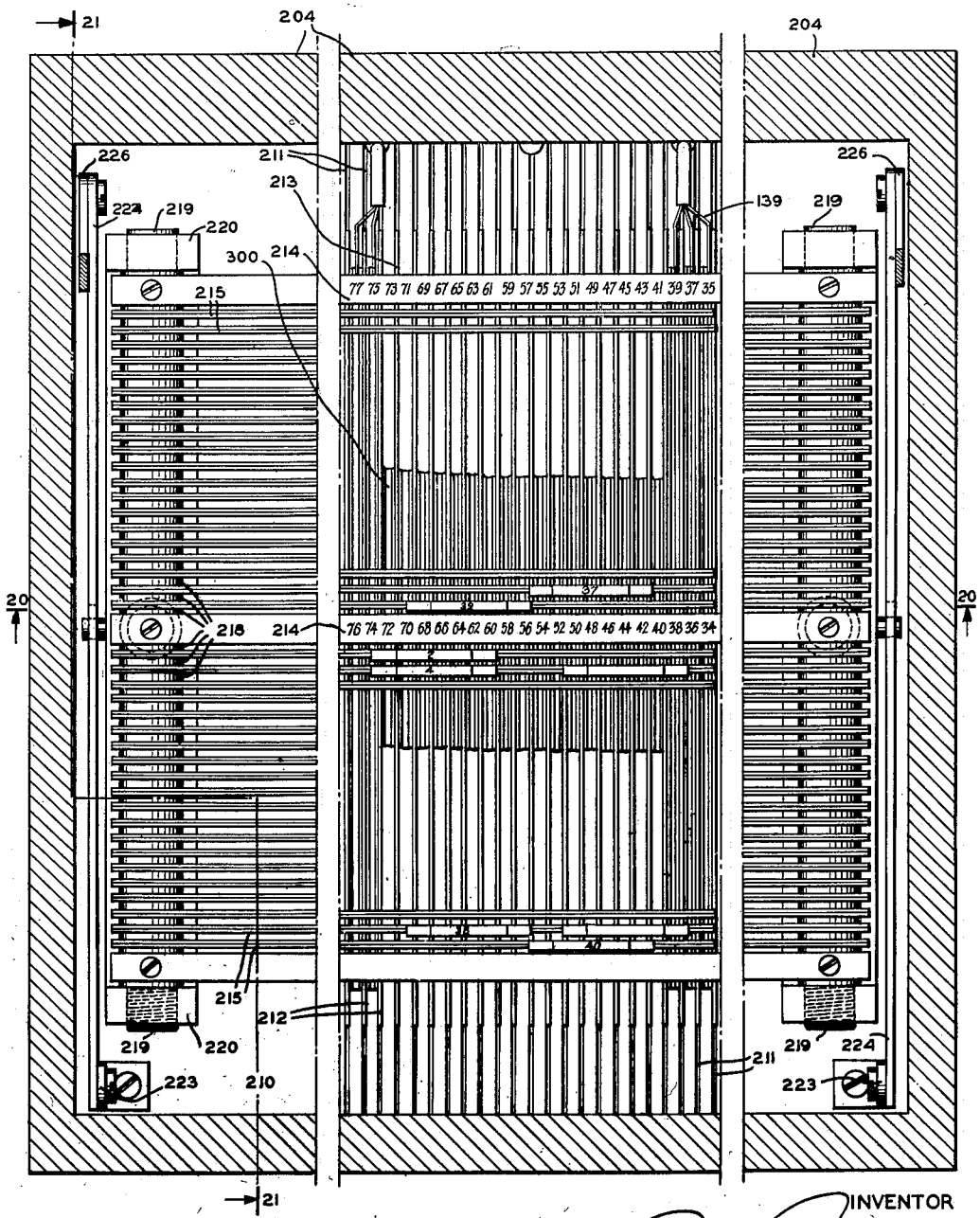
Fig. 19 is a top view of the switchboard.
Figure 20:
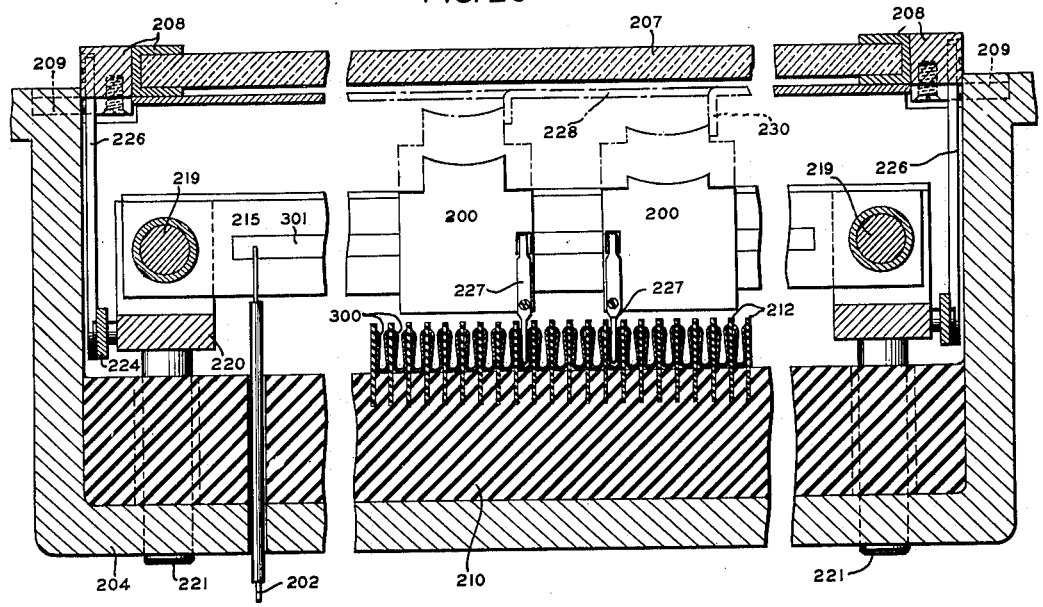
Fig. 20 is a cross section of the switchboard along lines 20—20 on Fig. 19.
Figure 21:
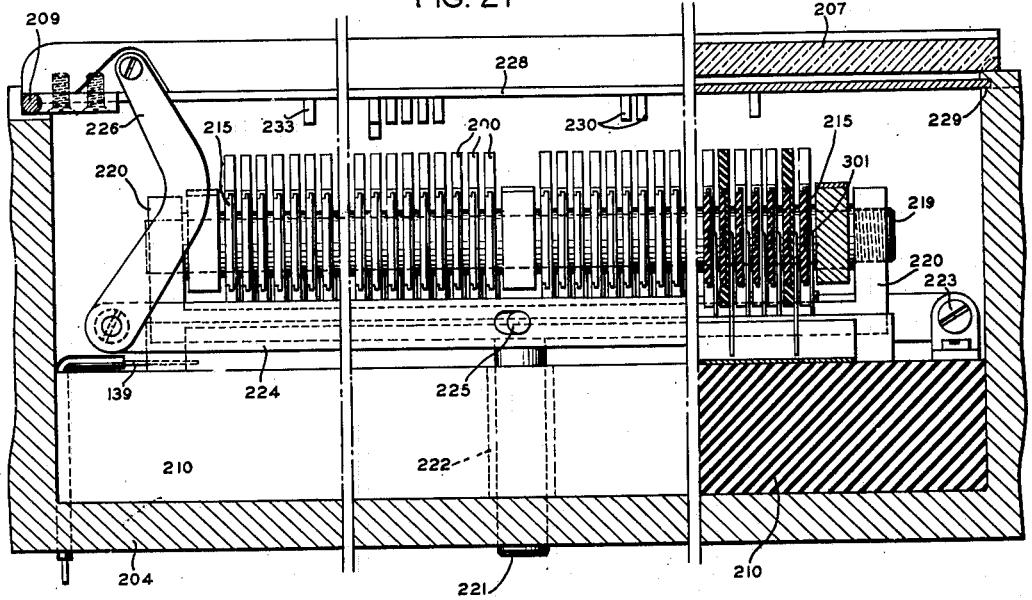
Fig. 21 is a side view of the switchboard and partial cross section along lines 21—21 on Fig. 19.

The rectangular opening 206 (see Fig. 11) in the top of the switchboard casing 204 is covered by a plate of glass 207 held in a metal clip 208 (see Fig. 20) pivotally secured to the casing by pin hinges 209. The front edge of the plate glass cover with its supporting clips is free to swing upwards. Secured to the inside of the bottom of the switchboard and covering substantially its entire area, is a thick sheet of insulating material 210 which serves as a base for the lower conductors, in which are milled slots 211 (Fig. 17) running from front edge to back edge of insulating sheet 210. In each slot is firmly secured two thin strips of insulating material 212 and 213. The space between two adjacent strips 212 or 213 forms a wide slot in which is held a springy, U-shaped strip of conducting material 300 (Fig. 20). These strips 300, of which there is one for each contactor 22 and 21, form the lower conductors. Each strip is permanently connected by a wire 139 (Fig. 22) to its corresponding contactor 22 and 21, i. e.: No. 1 strip $300_1$ shown at the upper right of the switchboard cross connections in Fig. 22 is connected by its wire $139_1$ to the first contactor 21 of the top row of sensing contacts 19a in the upper sensing chamber; No. 2 strip $300_2$ shown at the lower right of the same group of connections is connected by wire $139_2$ to the second contact of the same row; No. 3 strip $300_3$, located adjacent to No. 1, is connected by wire $139_3$ to the third contact. It will be noted by the scales 214 (Fig. 19) that the odd lower conductors 300 are located in the longitudinal half of the switchboard nearer the tabulator, and the even lower conductors in the half of the switchboard nearer the front edge. The upper conductors are arranged accordingly, i. e., odd uppers over odd lowers, and even uppers over even lowers. By this arrangement, the size of the switchboard is greatly reduced, permitting numerous connections to be practically and conveniently made in a small space.

The upper conductors are thin strips of metal, 301, (Fig. 17), long enough to extend from right to left of the group of lower conductors 300. Each strip 301 is imbedded in the side of a supporting strip of insulating material 215 (Fig. 18) and is permanently connected by a wire 202, (see Fig. 20), 140 or 148 to a related control magnet as shown in Fig. 22 and to be more fully explained hereinafter.

Some strips 301 as shown in Fig. 22 are connected to accumulator control magnets 201, some to step plate locking relays 105, some to selective magnets 137, etc., all arranged in desired numerical order. The identity of each strip 301 can be ascertained from its number 216 (Fig. 17) marked on the associated slider 200.

Figure 16:
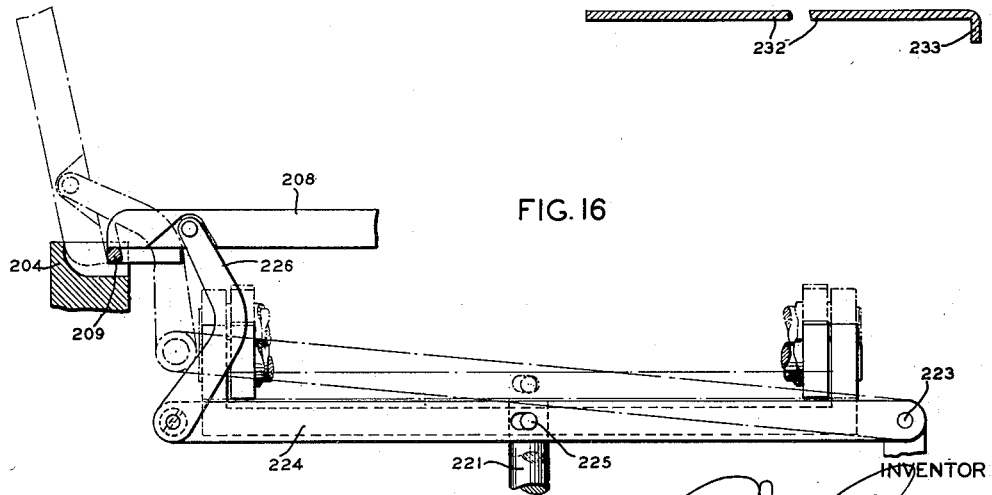
Fig. 16 is a side view of the switchboard raising mechanism.

All strips 215, suitably spaced from each other by washers 218 (Fig. 19, central left) are mounted at each end on a bar 219 (Fig. 17) which in turn is mounted at each end in a U-shaped support 220. Each of the two supports 220 is fastened to a rod 221 (Fig. 16) slidably mounted for vertical motion in a bearing 222 (Fig. 21) in the switchboard base. Therefore the upper conductors, as a group, can be moved a short distance up or down. This movement is caused by the raising or lowering of the glass cover 207 through a simple linkage. The clips 208 at each end of the glass cover 207 are immediately above the U-shaped holders 220 which support the upper conductors 301. Pivoted at 223 (Fig. 16) is a lever 224 slidably connected to support 220 by a pin and slot 225. At the other end of lever 224 is a link 226 connected to a clip 208. The action of this linkage is illustrated in Fig. 16. When the cover is raised, the upper conductors are lifted vertically a sufficient distance to allow sliders 200 a free travel on strips 215; when the cover is lowered, the conductors are lowered to permit positive contact between contacts 227 (Fig. 20) of sliders 200 and lower conductors 300.

On each strip 215 (Fig. 17) of the upper conductors, are slidably mounted one or more sliders 200 made of insulating material. Each slider carries a contact 227 (Fig. 18) with its upper end spring pressed against its coacting conductor 301; its lower end is so disposed and shaped as to engage with a lower conductor 300 when lowered. Since each lower conductor is connected with a contactor 22 or 21, and each upper conductor is connected with an accumulator, printer or other control magnet, and the sliders permit electric connection between the lower and upper conductors, it is possible to make any desired connection between odd upper and odd lower conductors and between even upper and even lower conductors, to connect the sensing means and the tabulator controlling means. A typical individual circuit would be as follows: grounded source of power 103a, Fig. 22, lead 106, switch 1320, lead 133, brushes 149 and conducting portion 150 of commutator 151, lead 135, switch 116, lead 136, armature of magnet 137, contact 146, switch 190, lead 138, a row of sensing contacts 19, through a card perforation to contactor 21, lead 139, lower conductor 300, contact 227 of a slider 200, upper conductor 301, lead 202, accumulator control magnet 201, to lead to ground.

Figure 13:
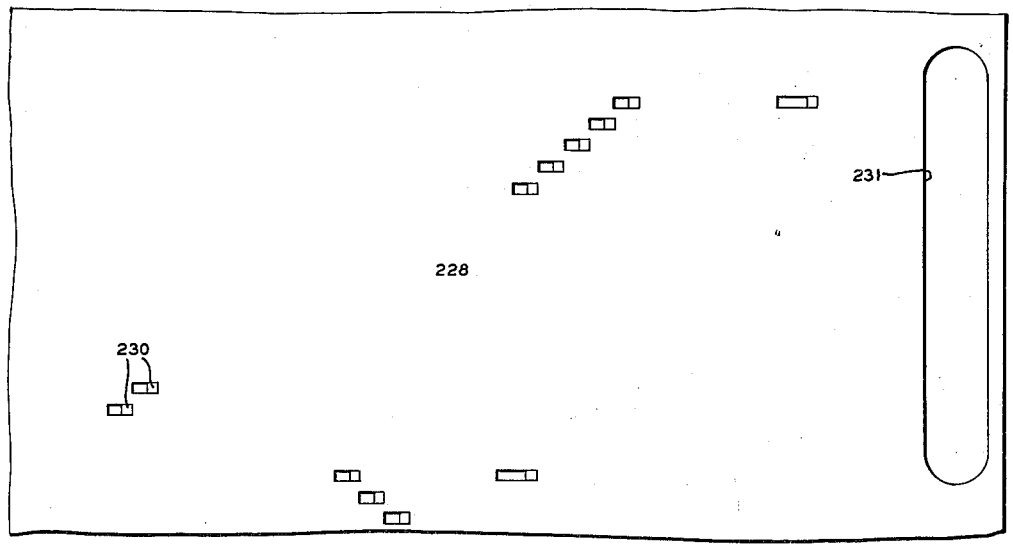
Fig. 13 is a partial top view of the master plate.
Figure 14:
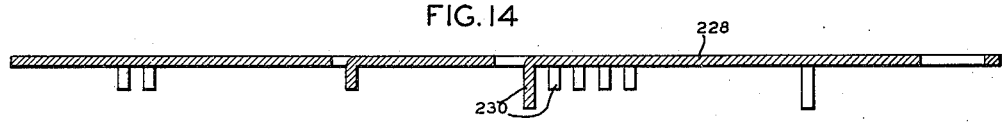
Fig. 14 is a cross section of the master plate.
Figure 15:
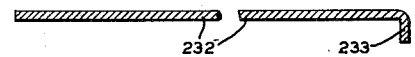
Fig. 15 is a cross section of the restoring plate.

When sliders 200 are pushed over to extreme right of the switchboard beyond the position of the lower conductors, they will not engage with the lower conductors when the cover is lowered and they are thus in a neutral position. To make a set-up, the cover is raised to lift the upper conductors so that their sliders will be free to move without engaging their contacts with the lower conductors. Sliders are moved to positions over desired lower conductors. The cover is then lowered and the slider contacts will engage the lower conductors completing the electric circuit. The sliders may be moved by hand or they may be set up with speed and accuracy by what I call a master plate. This master plate 228 (Fig. 13) is slidably mounted in grooves 229 (Fig. 21) near the upper, inner edge of the switchboard casing 204. Depending teeth 230 in this plate are disposed, when the plate 228 is moved from right to left by means of the finger hole 231, to pick up and to position sliders 200 to engage with desired lower conductors when switchboard cover is lowered. To bring the various sliders back to neutral position, I provide a restoring plate 232 (Fig. 15) slidably mounted in the same grooves, but normally placed towards the left of the switchboard. The leading edge of the restoring plate is bent downward as at 233, so that when the plate is moved from left to its extreme right position, its edge will pick up the sliders in its path and bring them to neutral position.

*Step plates*

When a card 3 is fed into the card chamber 41 by the picker knife 4, it is gripped at its middle and two ends by the slip conveyor belts 10 which advance the card into sensing position in the upper chamber UB, that is, with the lowest horizontal line of perforations in each card field (or lines 1, 14 and 27, of the card in Fig. 10) in alignment with the coacting series of sensing contacts 19c, 19b, 19a, respectively. The conveyor belts can be used for continuous advancement of the card while traveling through the card chamber but in the present disclosure, to obtain certain advantages, some of which have been noted, it is preferable to stop the card while sensing one or more horizontal rows of perforations.

Figure 5:
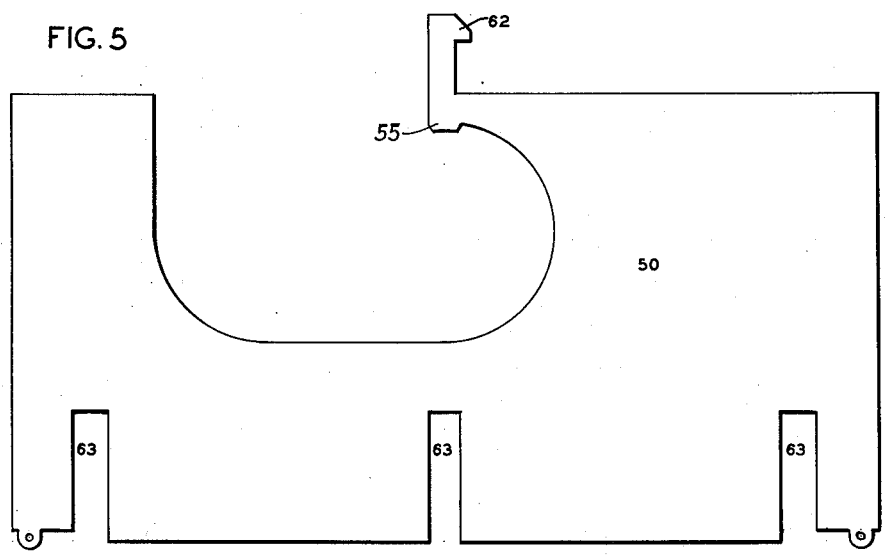
Fig. 5 is a plan view of a step plate.
Figure 7:
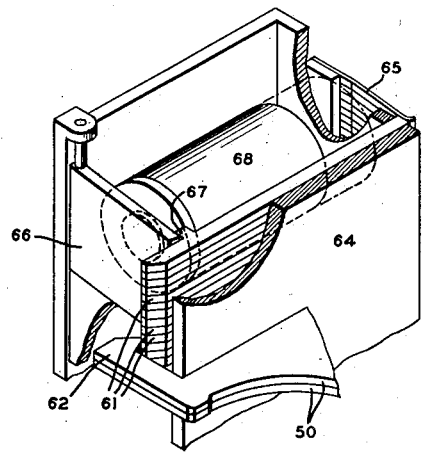
Fig. 7 is a perspective view of the means for locking step plates.

It is known, as is clearly recognized in the Lake Patent No. 1,772,492, the Mills Patent No. 2,016,681, and also herein that the electrical sensing devices of a perforated card controlled machine must make proper and dependable electrical contact when the perforations are analyzed and in previous machines this is obtained by lengthening the perforations to increase the duration of sensing contact to completely energize the controlling magnets. In the present case, the speed the feeding belts 10 are driven and/or the small perforations utilized prevents sufficient duration of contact to close the sensing circuits. Thus, the time of energization of the accumulator and printer control magnets in the sensing circuits is decreased so that their efficient operation cannot be derived. In the present machine the card is stopped each time the perforations are sensed and sufficiently long to make not only the dependable electrical contact necessary but also long enough to give full and complete energization to the controlling magnets to enable them to efficiently perform their functions. This may be done either by stopping the belts or, as herein shown, by stopping only the card. For the purpose of stopping the card in the card chamber for various sensing positions and also for holding it from one machine cycle to another, means are provided which I call step plates so arranged in groups designated by a subscript. A step plate 50, Figs. 1, 2 and 5, is provided for each position in which it may be desired to hold a card. In the present showing, each horizontal card field has 12 horizontal lines, Fig. 10, for data perforations 51, plus an extra line for printing or writing and for control perforations 101. Control perforations 101, however, are not necessarily confined to this line. Therefore a group of thirteen step plates is provided for each group of plates 50a, 50b, 50c or a total of thirty-nine step plates for each of the two sensing chambers UB and LB. The first of each group of thirteen step plates is called a holding plate and serves in certain types of operation to hold a card in the card chamber from one machine cycle to another. Moreover, as will be more fully described in detail, the first holding plate in each sensing chamber may be utilized to hold the card while control perforations 101 are sensed by sensing contacts 19a, 19b, 19c, for example, in a certain column to determine which of the three horizontal fields of the card must be sensed and therefore which two of the groups 50a, 50b, 50c of step plates must be retained locked and which one is unlocked by the energization of its respective magnet 68, Figs. 1, 2 and 7, thus selecting the particular horizontal field to be sensed by a single row of sensing contacts 19a, 19b, 19c to be used in sensing that card. The other twelve plates in the selected group are used to position the card successively for the twelve index positions in which data are recorded. A series of thirty-nine step plates comprising groups 50a, 50b, 50c, for example, is held horizontally between an upper supporting plate 53, Fig. 1, and a lower supporting plate 54, both fastened to sub frame 18. As shown in Fig. 2, each step plate extends the full width of the card chamber. The step plates are guided in their motion by the two side members of sub frame 18. Suitable slots 63 prevent interference with conveyor belts 10. The step plates are free to reciprocate from left to right in Fig. 1. In their left hand position, shown in Fig. 1, the leading edges are aligned to form part of the card chamber. The step plates can be individually advanced to the right a sufficient distance to intercept a card advancing under influence of the slip conveyor belts. When the leading edge of a card strikes the first step plate, the card is stopped in the first sensing position; and due to the friction of the conveyor belts, it is firmly held against the step plate. After sensing the first horizontal line of perforations, the first step plate is positively moved to the left in Fig. 1 permitting the conveyor belts to advance the card until it strikes the next step plate which has previously been advanced into the card chamber. The card is thus stopped consecutively for each desired sensing position until finally ejected. The step plates are moved to the left (Fig. 1) under control of cams 540, Figs. 1 and 2, one for each step plate, cooperating with an extended arm having a cam face 55, Figs. 1, 2 and 5, on each plate. The plates are individually movable to the right when released by a related cam 540 under influence of springs 56, two for each plate, which exert a tension between the plates and supports 57 secured to sub frame 18 and each cam 540 thereafter positively retracts its advanced step plate 50. The cams 540 are fastened to a vertical shaft 58 driven from main shaft 13 through gears 14 and 15, shaft 16, worm 59 and gear 60, Figs. 1 and 2. Shaft 58 makes one revolution per machine cycle. The timing diagram, Fig. 9, shows that the step plates of each group of thirteen in one sensing chamber have the same timing as the corresponding plates in other groups. There is a slight difference in the timing of the first holding plate to allow for card feed. Each step plate may be locked out of operation, that is, prevented from intercepting cards in the card chamber by an individual latch 61, (Figs. 2 and 22) locking under a hook 62 which forms an integral part of each step plate. Latches 61 are slidably supported one on top of another, Fig. 7, in alignment with their respective step plates and are held in place in the magnet support 64 secured to upper and lower supporting plates 53 and 54, Fig. 1. The latches are moved into locking position by comb spring 65 and can be prevented from locking by armatures 66, Figs. 1, 2 and 7, abutting against a lug 67 of each latch. In this showing, the armatures 66 are sufficiently wide to hold retracted thirteen latches which control the holding and step plates of a related group. Armatures 66 are attracted by magnets 68. When a magnet 68 due to its energization attracts its armature 66, latches 61 are prevented from locking their coacting step plates and a set of the latter may advance under control of its related cams 540. When an armature 66 is released, the controlled latches are advanced, due to the deenergization of the related magnet 68 at the end of the cycle, into position to lock a group of thirteen step plates and unless the magnet 68 is again energized the related set of plates 50 may not advance under control of its related cams 540. The magnets 68 are selectively operated by a circuit controlled either by hand switches 102, Fig. 22, or by card perforations 101, Fig. 10.

*Step plate locking circuit, Fig. 22*

As before explained, when an armature 66 is attracted by its magnet 68, latches 61 for that selected group of step plates 50 which position the card for sensing a particular field are shifted to disengage them from hooks 62 of the respective step plates so that the set of the latter may advance under control of its cams 540. When armature 66 is not attracted, its group of step plates will remain locked by the latches 61. Therefore, the energization of magnet 68 permits a related set of step plates 50 to advance, and its non-energization causes the plates to remain locked out of action.

Magnet 68 is energized in different ways over a circuit which includes a related manually settable switch 102, Fig. 22, which has four positions. The second or open position, as shown in Fig. 22, disconnects the source of power 103a from the related magnet 68. In the last machine operation in which the related group of step plates was utilized, the step plates were restored to normal locking position, and since the corresponding magnet 68 will not be energized, due to the opening of the related switch 102, the step plates will remain ineffective and in locked position as long as the related switch 102 is in such position, unless an automatically operated control, provided by commutator 110, to be subsequently described, is utilized. When switch 102 is set on its left hand contact 103, current is conducted directly to the related magnet 68, and its step plates 50 are unlocked so long as the machine is running. When switch 102 is set on its right hand contact 104, current is conducted to the related magnet 68 over the armature of a relay 105 which may be controlled as will later be described in detail, by sensing contacts 19 of a selected column working through control perforations 101. This circuit includes two brushes 117 cooperating with a conducting portion 118 and an insulating portion 119 of a commutator 120, one for each group of step plates. Commutators 120 are mounted on shaft 121 which may be any shaft in the machine making one revolution for each card cycle. The length of the conducting part of the commutator permits unlocking of step plates in time to allow feeding, sensing and discharge of a card for one machine cycle. Current passing over a commutator 120 energizes magnet 68. Upon operation of relay 105, current is disconnected from magnet 68 and connected to relay 105 where it forms a stick circuit under timing control of commutator 120. Commutator 120 is included in the circuit when only the first horizontal field or field *c* of a card not having a control perforation 101 is to be sensed and recorded and succeeding fields (field *a* and field *b*) of the same card are to be ignored. When switch 102 is set on its third position 113, the circuit for energizing the relay magnet 105 is placed under control of the switch points of a card lever 122 with a subscript relating it to other elements, one for each group of plates. These card levers are of the type well known in the art and currently used. The card in passing closes the coacting switch points which are open during the absence of a card. One card lever, coacting with, for instance, the left hand edge of the card, Fig. 10 is located in the card passage of each sensing chamber for each horizontal field of the card. As shown in Fig. 22, there are six such card levers. Other card levers such as card levers designated 58 and 59 in the patent to Lake 1,976,617 may be used for machine control involving the first and last card cycle, and as is well known these coact with the marginal edge of the card. The three card levers 122a, 122b, 122c (Fig. 24) in one sensing chamber are closed when the card is on the first holding plate of group 50a. When the card is on the second holding plate, that is the top plate of group 50b, the first card lever 122a is open and the second 122b and third 122c closed. When the card is on the holding plate of group 50c, the first 122a and second 122b levers are open and the third 122c one closed. When the card passes out of the sensing chamber, all three card levers may open. Each of these card levers is used to prevent sensing by its associated row of contacts 19a, 19b or 19c when a card has passed beyond that row of contacts. Referring to Fig. 24, it will be seen that each card lever is provided with supplemental contacts 122a', 122b', 122c', for the upper sensing chamber. Each of these contacts is the same as contacts 59 in the Lake Patent No. 1,976,617. In this patent contacts 59 control the sensing circuit of the lower brushes and since in the present machine the upper sensing chamber controls entry operations these same contacts designated 122a', 122b', and 122c' herein are interposed in the respective sensing circuit (see Fig. 22) for corresponding operation and function. Similar sets of contacts, which are the same as contacts 59 of the Lake patent, are also provided for the lower sensing chamber. These contacts being the same as contacts 59 of the Lake patent open the sensing circuit of the related set of sensing contacts when a card field passes beyond such sensing contacts, thereby preventing false circuits. These card levers also control the stick circuits of relays 105 which in turn control step plate locking magnet 68. Card levers 122a and 122d for the upper row of contacts 19 and 20 in each sensing chamber have a second set of switch points 123 which are included in the circuit of a relay magnet 125 operating switch blades 124 in the step plate locking magnet sensing circuit. While the circuit could be varied to permit control perforations 101 to be sensed while a card is held on each holding plate, the present showing contemplates the selection of groups of step plates while a card is held on the first holding plate of a sensing chamber; each group controlled by a card perforation 101 being locked, and the others not, during the passage of that card through a sensing chamber. Therefore, while a card is on the first holding plate, the sensing circuits for relays 105 are closed by switch blades 124 controlled by magnets 125 in series with card lever points 123. These points open when the card passes the first row of contacts 19 and 20 of each chamber. Magnets 68 may be energized also by a commutator 110 in a predetermined or preselected sequence.

It is to be understood that while the preceding description refers particularly to the arrangement of the three card levers for the upper sensing chamber UB, and shown in Fig. 24, the sensing chamber LB is also provided with a similar set of card levers and contacts, constructed and operating in the same manner as those provided for the upper sensing chamber UB. The three card levers for the lower sensing chamber LB are shown in connection with the wiring diagram in Fig. 22 and are identified by the reference characters, 122d, 122e, and 122f.

*Step plate locking circuit set manually for regular straight sensing, using one group of step plates and one, two or three horizontal rows of sensing contacts without step plate control perforations*

For straight sensing, only one group of step plates need be used in the lower and, if required for comparison or other purpose, as is now well known in the art, the upper sensing chamber. For example, switches 102 controlling magnets 68a and 68d will be set to contact their contacts 103. The other groups of step plates will remain locked out by setting switches 102 of the second, third, fifth and sixth groups on their open positions as shown in Fig. 22, thus rendering their respective magnets 68b, 68c, 68e and 68f deenergized and permitting latches 61 to remain caught under hooks 62 throughout the machine operation. Commutator 110, to be hereinafter described, will be disconnected by opening switches 164 and switch 112. The switches 102 for selecting the first group 50a and fourth groups 50d of plates, (the upper group in each sensing chamber), having been set on their left contacts 103; thus, throughout machine operation, respective magnets 68a and 68d for the first 50a and fourth 50d groups of plates will be energized over the following circuit: grounded source of power 103a, lead 106, lead 107, first and fourth switches 102 (from right side of Fig. 22), contacts 103, leads 108, leads 109, windings of the magnets 68a and 68d to ground. These two magnets 68a and 68d being continuously energized during machine operation, permit regular operation of the first groups of step plates 50a and 50d in the upper and lower chambers and the feeding and sensing of the card is accomplished as follows: The machine cycle of the tabulator disclosed is divided into sixteenths, Fig. 9. During the first point in the cycle of machine operation and in the time designated—Card feed by picker and belts 10— in Fig. 9 the card 3 is fed by the picker knife 4 through throat 9 to conveyor belts 10 which frictionally feed the card to the upper sensing chamber UB. At this time the commutator 151 is open so as to prevent false sensing circuits from being made. As shown by the timing diagram for Fig. 9, and referring to the timing for the "First holding plate," plate 50 of the group 50a has been moved to card stopping position by its springs 56 under control of its cam 54d and thus stops the feeding of the card to position it for a sensing operation. At this point, the card is held with the first, fourteenth and twenty-seventh horizontal lines (counting from the bottom of Fig. 10) each opposite a respective one of the three rows of sensing contacts 19a, 19b, 19c and contactors 21 for sensing of possible control perforations 101. In the present set up these perforations do not control the magnets 68. The first holding plate 50 of the group 50a is then moved to the left (Fig. 1) by its cam 54d to clear the card chamber and permit the card to be moved quickly down to the first step plate 50 of the group 50a by the conveyor belts 10. During its travel, the card is kept from lateral deviation by lateral guides 46. Should the card deviate from the horizontal, it is straightened against the step plate by and under control of the sliding, friction drive of the belts. When the leading edge of the card abuts upon the first step plate 50, of the group 50a, the second, fifteenth and twenty-eighth horizontal lines are opposite respective rows of sensing contacts 19a, 19b, 19c and contactors 21 and may be sensed by the circuit previously described under "Switchboard." The card thus travels from magazine to holding plate, and from one step plate to the next, in timing synchronized to the recording and accumulating mechanism of the tabulator and then ejected to the storage hopper, being held long enough on each plate for sensing the associated horizontal row or rows of perforations. During the time the card is ejected after an entry operation commutator 151 opens the sensing circuits to prevent false closure thereof. In the illustration given, the card will not be affected by the second, third, fifth and sixth groups of plates 50b, 50c, 50e, 50f because these were retained locked by the manual setting of their respective switches 102 to open positions.

In general, by manually setting a particular switch 102 to engage its contact 103 the related magnet 68 is directly energized and in this case the other two switches 102 are in open position so that the other two magnets 68 are deenergized. Switch 102, for one example, related to the first set of step plates 50a may then cause the magnet 68a to be energized to release the related set of plates 50a. Hence, if the three fields of the card in Fig. 10 are to be sensed, the three rows of sensing contacts 19a, 19b, 19c will sense them to direct the impulses to different sets of accumulators or printing magnets. The selection of the second set of step plates 50b by the related switch 102 will let the card drop sufficiently to allow only the upper two fields of the card in Fig. 10 to be sensed by the two rows of sensing contacts 19b, 19c. The selection of the third set of step plates 50c by the related switch 102 will let the card drop sufficiently to allow only the uppermost field of the card to be sensed by the lowermost row of sensing contacts 19c. The above describes how the machine may be pre-set manually by switches 102 to select certain fields to be sensed by the manual selection for operation of a single set of step plates.

*Step plate locking circuit set for selective control by control perforations*

Since rows of sensing contacts 19a, 19b, 19c and contactors 21 may be individually used, the card may be controlled by one or, successively, two or more groups of step plates, and in accordance with predetermined requirements the tabulator may be set up for many varying combinations of accumulator control and recording. I give as an illustration, the following example of a set up using one row of sensing contacts 19c for accumulator and recorder control, and for step plate group control to select, for sensing, certain fields of the card and to ignore others according to control perforations 101. Set up is made as follows: switchboard sliders 200 are positioned to connect desired accumulator magnets 201 and printing control magnets 203 to desired card columns, using the third or lowest horizontal row of contacts 19c in the upper sensing chamber. (Note.—Either sensing chamber may be used.) Other sliders 200 (Fig. 22) are positioned to cause the energization of relays 105 for the first, second and third group of step plates 50a, 50b, 50c in the upper chamber respectively by the sensing contacts 19c in the upper sensing chamber, in the card column reserved for step plate control perforations 101, as, for instance, column 77, Fig. 10. Switches 102 for the three groups of plates 50a, 50b, 50c in the upper sensing chamber are set in their third position on contacts 113; remaining switches 102 are set in their second or open position as shown in Fig. 22; card lever switch 114 is closed and switch 115 opened; commutator control switches 164 and 112 are opened. Manually operated switches 116 are provided for rendering any row or rows of sensing contacts operative or inoperative as desired. In the set up here described, switches 116 for the first, second and third rows of sensing contacts 19a, 19b, 19c are closed and those for the fourth, fifth and sixth rows of sensing contacts 20a, 20b, 20c (lower chamber) are opened. With the above setting, the circuits operate as follows: when a card is fed into the upper chamber UB, the three card levers 122a, 122b, 122c for that chamber are operated by the card to close their contacts and connect power to the following circuits: magnets 68a, 68b, 68c for the first, second and third groups of step plates 50a, 50b, 50c in the upper sensing chamber become energized over the following circuit: source of power 103a, lead 106, lead 107, first, second and third switches 102, their contact points 113, short leads 130, respective card lever points now closed, leads 131, leads 132, armatures of relays 105, leads 109 to magnets 68a, 68b, 68c and ground. Magnets 68 are now energized to retract latches 61 unlocking all of the sets of step plates 50a, 50b, 50c. Upper card lever 122a closing its second set of points 123, closes the circuit to relay magnet 125 as follows: source of power 103a, lead 106, switch 132D, lead 133, to switch 114, now closed, lead 134, points 123 of upper card lever 122a to magnet 125 to ground. Magnet 125 attracts its armature which, by means of an insulated connecting bar, closes multiple switch blades 124 for the upper sensing chamber. Switch blade 124 is included in the perforation sensing circuits which operates relays 105 through control perforations 101. The card now rests upon the first holding plate (the other step plates at this part of the machine cycle are still held out of the card chamber by their cams 540. The first, fourteenth and twenty-seventh (from the bottom) horizontal lines of index points are in line with the respective third, second and first (counting from the top of Fig. 1) rows of sensing contacts 19c, 19b, 19a and contactors 21. It is here explained that in the mode of operation now being described when the card rests upon the first holding plate there is a sensing at this time of all perforations 101 and this preliminary sensing determines which ones of the sets of step plates are to be subsequently effective or ineffective to control sensing of the data of selected card fields. Taking the card shown in Fig. 10 as an example, we find, on the first row from the bottom, a step plate control perforation 101. The intention of this perforation in this set-up is to cause the tabulator to ignore the data perforations in the fields of the card so marked, in this case the lowest or field c, and to sense successively the other fields, in this case the middle and upper fields or field b and field a since no control perforations have been placed in those fields. This is done by locking the first group of step plates 50a out of the card passage and leaving the others 50b and 50c free to function under control of their cams and springs. The locking is accomplished after the card reaches the holding plate and before the other step plates have entered the card passage. Plates 50a, when locked, are held so by the stick circuit to be described until the card passes beyond that group. Any group of step plates is locked, also, when their coacting card lever points are open. Since a contact 19c in the seventy-seventh column for field c of the card has engaged a related conductor 21 through the control perforation 101, the following circuit will be energized: source of power 103a, switch 132D, lead 133, over brushes 149 and conducting segment 150 of a commutator 151 which makes one revolution per machine cycle in timed relation with the advance of the step plates and accumulator clutches, lead 135, switch 116 for the lowest row of contacts 19c, lead 136, armature of magnet 137 (now with closed contact 146), switch 190 in the position shown, lead 138, contacts 19c (seventy-seventh column), through perforation 101, coacting contactor 21, lead 139₇₇, lower switchboard contact 300, slider 200 now shown as set to connect the seventy-seventh of the third row of contacts 19c with upper switchboard contact 301, lead 140a, lowest switch blade 124 now closed by magnet 125 as above described, other lead 140a, coils of relay 105a to ground. Relay 105a will attract its armature, opening the circuit to magnet 68a which releases its armature 66 so that latches 61 (Fig. 2) may again lock the group of step plates 50a. The armature of relay 105a will remain attracted to retain magnet 68a deenergized by the following stick circuit so long as the card closes the points of the card lever 122a for the first group of plates 50a: source of power 103a, lead 106, lead 107, closed switch 102, contact 113, lead 130, closed points of card lever 122a, lead 131, lead 132, armature of relay 105a to coil of relay 105a to ground. In this illustration, the first group of step plates 50a becomes lockable at this point, and the other two 50b and 50c of the upper sensing chamber are free to operate.

The perforation 101 at field c (Fig. 10) having been sensed, the first holding plate retires from the card passage and becomes locked under its latch 61. The other plates of the same group 50a being already locked by the deenergization of magnet 68a, the card is rapidly advanced by the conveyor belts 10 to the first data or "9" step plate of the second group 50b, i. e., the plate immediately under the second holding plate which retired simultaneously with the first and third holding plates. This rapid advance of the card is shown in the timing diagram of Fig. 10 by the designation "Supplemental feed by belts 10" and at this time, as shown in the diagram, commutator 151 opens the sensing circuits to prevent the possibility of false closure thereof. The card now presents the fifteenth (from the bottom) horizontal row of index points to the bottom row of sensing contacts 19c. This is the first row of numerical or alphabetical data points in the middle field of the card or field b and perforations will be sensed by the sensing contacts 19c by the following circuit: source of power 103a, lead 106, switch 1320, lead 133, brushes 149, conducting segment 150 of commutator 151, lead 135, closed switch 116 for the third row of sensing contacts 19c, lead 136, contact 146 engaging armature of magnet 137, closed switch 190, lead 138, sensing contacts 19c, through perforations 100 to contactors 21, associated leads 139, to lower switchboard contacts 300, properly set sliders 200, upper switchboard contacts 301, leads 202, accumulator entry control magnets 201 and printer control magnets 203 to grounded return lead. The said switchboard contacts, etc. have been described in detail under the heading "switchboard." The card then drops to the next step plate and is sensed in the same manner by sensing contacts 19c. This operation is repeated on each plate until all rows of index points in the middle field or field b have been sensed. The card then drops to the third holding plate to open card lever 122b where it is held in the card chamber until the next machine cycle begins. After the trailing edge of the card has released the card lever 122b controlling magnet 68b for the second group of plates 50b, those plates become locked due to the deenergization of magnet 68b. The third field of the card or field a is sensed in like manner by sensing contacts 19c while the card travels from plate to plate in the third group 50c and then out to a discharge magazine.

*Step plate locking circuit set for selective control by more than one control perforation*

In the above example sensing contacts 19c were utilized for step plate control but since the wiring for the three groups of step plate control is identical, sensing contacts 19a and 19b may also be utilized for sensing control perforations 101 relating to corresponding fields and in this instance other card columns, such as the 76th and 75th may be appropriated to receive such perforations which are preferably adjacent fields b and a to prevent possible misoperations in sensing such perforations.

If each field was provided with a special perforation 101 these three perforations are sensed by contacts 19a, 19b and 19c when the card is on the first holding plate to cause the three sets of step plates 50a, 50b, and 50c to be locked after having been unlocked and all of the fields would be ignored for sensing the data thereon.

If perforations 101 were adjacent of fields b and a the two perforations would be sensed by contacts 19b and 19a and the two sets of step plates 50b and 50c would be locked and upon retraction of the first holding plate the card would be immediately fed to the first data step plate of the set 50a and only the data in field c would be selected for data entry.

*Recording data from a card in excess of tabulator printing capacity*

The card shown in Fig. 10 may easily hold several times the amount of data which can be recorded during one machine cycle by tabulators now in current use. The present invention provides means for recording the data on one card in several printed lines or tabulating cycles, the card being held in the sensing chamber between cycles. As before mentioned under "Step plate locking circuit," magnets 68 may be controlled by commutator 110. The card in Fig. 10 has three horizontal fields each of which, due to the small size of the perforations which it is practical to use with this invention, could if the perforations were made slightly narrower in width record 140 characters. Tabulators in general use have about seventy printing and/or recording devices. If it is desired, for instance, to print, during one card cycle on a tabulator of this capacity (seventy printing devices), all the data on a card having 420 (3 x 140) recorded characters, this invention provides means for causing a tabulator to print and/or record a plurality of tabulator lines consecutively from one card during one passage of the card through the card chambers. This same feature of the invention can be explained by assuming that the machine has only 35 columns of printing devices and that the card is perforated to represent 70 columns of data, the left half of the card having 35 columns and the right half having 35 columns. The problem to be solved is to print all of this data by only 35 columns of printing devices. This can be done by using all six of the groups of step plates 50a—50f, the card being controlled during the first tabulating cycle by the first group of plates 50a, then held on the next holding plate, then controlled by the second group of plates 50b during the next tabulating cycle, etc. In this case the locking and unlocking of the groups of step plates 50 is controlled by a commutator 110, conventionally shown in Fig. 22 in developed form, mounted on a shaft 155 making one revolution for six tabulating cycles. There are insulatedly mounted on the commutator six contacts 156 coacting with individual brushes 157, the length of each contact being timed to unlock and permit relocking of one group of plates during one entire tabulating cycle. Contacts 156 are in electric connection with the source of power through continuous contact 158 and brush 159. Brushes 157 are connectable to magnets 68 by means of a switchboard 160 of the same type as the larger switchboard previously described. The set-up of the step plate locking circuit is as follows: The thirty-five contacts 21 cooperating with the left half of the card sensed by sensing contacts 19c in the upper sensing chamber are connected through the switchboard by means of sliders 200 to respective ones of the thirty-five accumulator magnets. The thirty-five contacts 22 on the opposite half cooperating with the right half of the card sensed by contacts 20c in the lower sensing chamber are connected to the same respective accumulator magnets, i. e., the first accumulator magnet 201 may be connected to the first contact 21 in the row of sensing contacts 19c and also to the thirty-sixth contact 22 in the row of sensing contacts 20c. A plurality of sliders 200 are provided for this and other purposes on each upper conductor 301. Sliders 163 on the smaller switchboard 160, which is of similar construction to the larger switchboard hereinbefore described, are set, as shown by dotted lines in Fig. 22, to connect the first contact plate 156 with magnet 68a of the group of step plates 50a, the second contact plate to the second group, etc. Switch 112 and all of the switches 164 are closed and all of the switches 102 are opened. During machine operation when each contact plate 156 connects with its brush 157, a related group of step plates 50 will be unlocked over the following circuit, and the others kept locked; source of power 103a, lead 106, switch 1320, lead 133, lead 165, closed switch 112, lead 165, brush 159, contact 158 to each contact plate 156, brush 157, a cross conductor 162, a set slider 163, a cross conductor 161, a switch 164, a lead 166, lead 108, lead 109, coil of magnet 68 to ground. Other magnets 68 remain deenergized and their step plates locked until their brushes 157 are reached in consecutive order by the contact plates 156, one for each tabulator cycle. As a result, the card is fed to the first holding plate, travels from one step plate to the next of the first group 50a while one half of the card field c is recorded and printed under control of half of sensing contacts 19c on one tabulator line; the card is held by the second holding plate until, in timed relation to the next tabulator cycle, it travels through the second group of step plates 50b, recording and printing under control of the same half of sensing contacts 19c on the next tabulator line one half of the card field b, and so on to sense one half of field a and the operation is repeated in chamber LB, the other half of the fields cooperating with the other half of sensing contacts 20c. During the operations just described, the proper feeding of cards from the magazine i. e., one for each six cycles may be accomplished either by the mechanical arrangement shown in Fig. 4 and already described or by an electrical control now to be described. Referring to Figs. 3, 4 and 23, mounted on frame 1 of the tabulator is a magnet 170 near each end of the casting supporting the picker knife 4. Each magnet 170 has an armature 171, normally held in unattracted position by a spring 172, which when attracted will move into a notch 173 in the picker knife holder to restrain the picker knife from downward motion thus preventing cards from being fed from the magazine so long as magnets 170 are operated. Arms 24 have a connection 1730 which may expand when armatures 171 lock the feeding means. Magnets 170 are operated by a circuit which includes the upper and the lower sensing chamber card lever points or contacts 122c and 122f and a pair of manually operated switches 174 and 175 to include either one or both card lever points. The card levers are positioned to stop card feeding so long as a card is under one or the other card lever, according to the position of the switches 174, 175, and to permit renewed card feed for the next card cycle when no card is under the proper card lever. For example, when a three field card is used to be sensed by the third or lowest row of sensing contacts 19c of the upper sensing chamber and one field is cancelled by a control perforation 101, that card would be held in the card chamber of the upper sensing chamber for the duration of only two tabulating cycles, whereas a card with none of the fields cancelled would be held during three tabulating cycles. It is therefore desirable to have a variable card feed under control of card actuated means. Magnets 170 are operated by the following circuit: grounded source of power 103a, Fig. 23, lead 106, lead 176, coils of magnets 170, lead 177, one of switches 174, 175, one of leads 178—179, points of one of card levers 122c, or 122f to ground.

*Operation of selective magnets 137*

Selective magnets 137 may be operated from the same or similar perforations 101 used for control of step plate group selection previously described. Each magnet 137, when operated, renders inoperative a related row of sensing contacts 19 or 20. It is possible, by means of sliders 200 in the switchboard, to connect for one sensing chamber two or more horizontal rows of contacts 21, each row of which will sense a separate card field, to the same group of accumulator control magnets 201. The presence of perforations 101, when selective magnets 137 are properly connected, will cause one or more desired fields to be ignored so that only a single field will control the accumulator control magnets 201. Thus perforations 101 may be used to cause the tabulator to ignore certain data perforations (in this showing, certain horizontal fields) in the card. For this type of selection switches 190 are in the full line position shown. Magnets 137 are operated over the following circuit: source of power 103a, lead 106, switch 1320, lead 133, one of brushes 149, conducting segment 150 of commutator 151, other brush 149, lead 135, switches 116, leads 136, over armatures of magnets 137, contact 146, switch 190, leads 138, sensing contacts 19, through perforations 101 to contacts 21, leads 139, lower switchboard contacts 300, properly set sliders 200, upper switchboard contact 301, leads 148 (of which only two are shown in Fig. 22 for clarity), coils of magnets 137 to ground. Magnets 137 are now energized so that the armature engages contact 147 and are held operated by the following stick circuit: from source of supply 103a over the previously described circuit to armatures of magnets 137, contacts 147 to coils of magnets 137 to ground. Contacts 146 and 147 are spring or make before break contacts so the change from one to the other by the armature is made without break of the current to the coils of magnet 137 which continues under control of commutator 151 through the sensing cycle.

Selective magnets 137 may be used with a positive effect instead of the negative effect just described. Certain accounting methods may require the selecting of a certain field, or fields, of a card which may be identified by a control perforation 101, and ignoring other fields not so identified.

Switch 190, included in the main lead 138 to each row of sensing contacts 19 or 20, has a contact point 191 connected by a short lead 192 to another contact 193. For this type of selection switch 190 is positioned to engage point 191. When armature of magnet 137 is attracted, it makes electric contact with 193 as well as 147. Shunting the armature of magnet 137 and switch 190 having a lead 138 above the switch, are two conductors 194 and 197, a pair of brushes 198 coacting with a conducting segment 196 on commutator 195, one for each row of sensing contacts 19 or 20. Commutator 195 is mounted on shaft 121 which makes one revolution per machine cycle; segment 196 completes the circuit from lead 136 to lead 138 while a card is on a holding plate for the sensing of control perforations 101 to thus cause the closure of the circuit to magnet 137.

When perforations 101 are to be used for selecting a card field, switch 190 is set on contact 191. Current for sensing control perforations 101 while the card is on the first holding plate will be shunted around switch 190 by the commutator 195. The machine may be conditioned for concurrent sensing of a plurality of fields and in this case the set of step plates 50a are selected for operation to enable the sets of sensing contacts 19a, 19b and 19c to concurrently sense the three fields. Perforations 101 are sensed, as previously described, when the card is on the first holding plate, and in accordance with such perforations the corresponding magnets 137 are energized. For further sensing of data perforations during that machine cycle, current will be supplied over the following circuit, (magnet 137 having been operated through a control perforation 101): source of power 103a to armature of magnet 137 (as above described), over said armature to contact 193, lead 192, contact 191, switch 190 to lead 138 and through the regular sensing circuit previously described. While commutators 195 will permit sensing of control perforations 101 only, data perforations in each card field will be sensed only if magnets 137 attract their armatures. The magnets 137 operate with a stick circuit previously described during the sensing of data perforations.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

I claim:

1. In combination, means for feeding record cards having small perforations at successive index point positions in a card field, means for sensing said perforations at said index point positions, record feeding means continually operated during a sensing operation of said perforations by said sensing means, for feeding the card at a speed greater than the speed at which the sensing means can effectively sense the small perforations, and means including operating means therefor operative during the sensing of said card field for momentarily stopping, against the action of said record feeding means, said card at successive index point positions to enable the sensing means to effectively sense the small perforations and thereafter releasing said card to the action of record feeding means to feed the card to the next index point position.

2. In combination, a plurality of sensing stations comprising at each station a single set of sensing means for sensing card fields at different portions of a common record for controlling entries in an accumulator, each record having a plurality of superposed data representing card fields at one portion of the record and a plurality of other superposed data representing card fields at the other portion of the same record, means for feeding said records to successively place the card fields at one portion of the record in operative relation to the sensing means at one station, and then to successively place the card fields at the other portion in operative relation to the sensing means at the other station, a plurality of step by step card positioning means for each sensing means and each positioning means comprising means when rendered effective for causing under control thereof a card field to be successively positioned, step by step, past said sensing means by said record feeding means, and sequentially operable means operating in timed relationship with the feeding of the record past the sensing means at both stations for causing said plurality of card positioning means for one station to be rendered effective in sequence, and then the plurality of card positioning means for the other station to be rendered effective in sequence, whereby all of the aforesaid data representing fields are sensed during the feeding of the card past the sensing means at both stations.

3. In a machine in which perforations in a record are utilized at index point positions to represent data entered in the machine effected by the energization of an electrical instrumentality, the combination of sensing means for sensing said perforations and in an electrical operating circuit with said electrical instrumentality, means for feeding said record to said sensing means to effect the closure of the operating circuit through said perforation at a predetermined index point position by said sensing means, the continued feeding of the record by said feeding means after closure of said circuit causing said perforation due to its dimension in the direction the record is fed to be brought out of cooperative relationship with the sensing means to open said circuit, and means for successively stopping said record with each of said index point positions in cooperative relation with said sensing means to cause, while the record is sensed at a rest position, the prolonged closure of the operating circuit through the perforation sensed to effect an energization of said instrumentality to enable the latter to effect a data entry operation, and for successively releasing said record at each index point position for causing the feeding of the record to the next index point position.

4. In combination, means for sensing a record card having small perforations at a plurality of index point positions in a single card field, means for feeding said record card past said sensing means at a rate of speed greater than that at which said sensing means can effectively sense the small perforations, card stopping means coacting with said card for stopping the record with each index point position in operative relation with the sensing means, and means operative during the sensing operation for operating said stopping means to momentarily hold said card against feeding by said feeding means at each index point position to enable the sensing means to effectively sense each perforation thereat.

5. In combination, means for feeding record cards having a plurality of index positions, means for sensing data represented at the index positions of said cards, card stopping means for stopping said card at respective index positions of said cards, means for operating said card stopping means to cause said cards to be stopped at each index position for sensing by the sensing means, devices for preventing the operation of said card stopping means by said operating means, and selecting means for controlling said devices for determining whether or not said devices are to be effective for preventing operation of said card stopping means.

6. In combination, means for feeding record cards having a plurality of index positions, means for sensing data represented at the index positions of said cards, a plurality of card stopping means for stopping said card at respective index positions of said cards, means for operating said card stopping means to cause said cards to be stopped at each index position for sensing by the sensing means, devices for preventing the operation of said card stopping means by said operating means, and means controlled by said sensing means upon detection of a special designation for selectively controlling said devices for determining whether or not said devices are to be effective for preventing operation of said card stopping means.

7. In a machine having record sensing means and a record magazine, the combination of means continually operated at a constant speed for feeding records from said magazine to said sensing means, then through operative relation with said sensing means, and thereafter away from said sensing means, and means contacting with the record to momentarily hold the record at successive positions of the record for sensing by said sensing means and to thereafter release the record for feeding by said feeding means from said sensing means, whereby said record is fed by said feeding means through operative relation with said sensing means more slowly for sensing operations than said feeding means feeds the record to and from said sensing means.

8. In combination, record sensing means, means for feeding records having a plurality of data representing fields past said sensing means to be successively sensed thereby, each field comprising rows of index point positions, a plurality of successively operated sets of card stops, one set for each field and each set comprising a plurality of card stops, means for successively operating the card stops of each set when conditioned for operation to cause said card to be fed by said feeding means step by step under control of the selected set of stops whereby the rows of index point positions of the card field associated with the related set of card stops are successively correlated with the sensing means, a plurality of devices, one for each set of card stops, each for conditioning the related set of card stops for operation by said operating means, and means for causing said devices to be operative in succession to cause under control of each set of stops conditioned for operating the successive correlation of the index point positions of each card field with the sensing means.

9. In combination, a single set of sensing means for sensing record cards having a plurality of superposed card fields, each card field comprising rows of index points, means for feeding said records past said sensing means, a plurality of card positioning means, one for each card field and each coacting with the card for modifying, when conditioned for operation, the feeding of the card by said feeding means as successive index point positions of a card field are sensed by said sensing means, means for operating the positioning means which is conditioned for operation to cause the feeding of the card to be modified by said positioning means during the sensing operation of the related card field, and means to cause said plurality of positioning means to be conditioned for operation in succession by said operating means.

10. In combination, a plurality of successively arranged record sensing means for concurrently sensing a plurality of superposed card fields of a common record, means for feeding said record to said plurality of sensing means prior to a sensing operation and subsequently past said sensing means, means to control the subsequent feeding of the record by said feeding means during the concurrent sensing of said card fields by said plurality of sensing means comprising, a single set of successively operated card stops for stopping the feeding of the record as the index point positions of each card field are successively sensed by the corresponding sensing means, and operating means operative during said concurrent sensing operation to successively operate said card stops.

11. In a record controlled machine controlled by record cards each having a plurality of data representing fields, a single set of record sensing means, card feeding means for feeding said records to move said record card fields past said sensing means in succession, a plurality of card stop means and sequentially operable means for effecting the sequential operation of said card stop means to cause the stopping of said cards as they are fed by said card feeding means to position said card fields for sensing thereof in succession by said data sensing means, selecting means controlling said sequentially operable means for determining whether or not selected ones of said card stop means are to be effective to position corresponding card fields for sensing operations, card feeding mechanism for feeding a record from a supply stack to said card feeding means, means for normally operating said card feeding mechanism once for each card field sensed, means for detecting the presence of a card in operative relation with the sensing means, and means controlled by said last named means for suppressing the operation of said card feeding mechanism as long as the record is being sensed.

12. In a record controlled machine controlled by record cards each having a plurality of data representing fields, a single set of sensing means, card feeding means for moving said record card fields past said sensing means in succession, a plurality of card stop means and sequentially operable means for effecting the sequential operation of said card stop means for positioning said card fields in succession for sensing thereof during a plurality of successive sensing operations, selecting means controlling aid sequentially operable means for determining whether or not selected ones of said card stop means are to be effective to position corresponding card fields for sensing operations, card feeding mechanism for feeding a record from a supply stack to said card feeding means, means for operating said card feeding mechanism, controlling means for conditioning said card feeding mechanism for operation by said operating means, and means operable upon the completion of sensing of all selected card fields for causing the controlling means to be operative to condition said card feeding mechanism for operation by its operating means.

13. In a machine of the class described, a plurality of data sensing means for concurrently sensing data in a plurality of fields of a common record, a plurality of supplemental sensing means one for each of said data sensing means for sensing special perforations at a plurality of predetermined positions on the record, each special perforation to determine whether the related sensing means is to be operative or inoperative for sensing of a related field, means for feeding said record past said sensing means including means to position the record to effect the concurrent sensing of the data in the plurality of fields and positioning said record prior to the data sensing operation for sensing of the special perforation, a plurality of controlling means, one for each card field controlled by the special perforation sensing means and including means controlled thereby for rendering the related data sensing means inoperative or operative upon sensing a special perforation, a plurality of connecting means, one for each of said special perforation sensing means for causing each of said controlling means to be controlled in its operation by the related special perforation sensing means, and a plurality of settable means intermediate each of said controlling means and the related data sensing means for determining whether the means controlled by the related controlling means will render the related data sensing means operative or inoperative upon sensing a special perforation.

14. In a cyclically operable machine controlled by record cards having a plurality of data representing fields, sensing means for sensing said data representing fields, card feeding means for feeding said records past said sensing means, a plurality of card stop means and sequentially operable means for controlling the card stop means to control the feeding of the record to position said card fields in succession to said sensing means, record card feeding mechanism for feeding records from a supply hopper to said feeding means, means for operating said record card feeding mechanism once for each sensing operation from each data representing field, means for suppressing the operation of said card feeding mechanism by its operating means, and means for controlling the operation of said suppressing means comprising a card lever in the path of the record and operated thereby to render said suppressing means effective as long as it is operated by the record being sensed.

15. In a cyclically operable record card controlled machine, the combination of a record card feeding mechanism normally operative for each entering operation for feeding record cards from a supply magazine, a plurality of sensing stations each of which comprises sensing means for controlling entering operations, record card feeding means for feeding said cards past said sensing means, means for positioning a plurality of different card fields of one record card in succession to the sensing means at one station and then positioning a plurality of other different card fields of the same record card in succession to the sensing means at the other station, comprising at each station, a plurality of card stop means and sequentially operable means at that station for controlling the card stop means to control the feeding of the record card to position the card fields to be sensed at that station in succession by the sensing means thereat, means for suppressing the operation of said record card feeding mechanism, a plurality of card levers, one at each sensing station and operated by the record card during successive entering operations effected by the sensing means at that station, and means controlled by each of said card levers for causing, when said card levers are operated, the operation of said suppressing means to prevent the operation of the record card feeding mechanism during the time successive entering operations are effected under control of either of the corresponding sensing means.

16. In a cyclically operable record card controlled machine, the combination of an accumulator, a plurality of sensing stations each of which comprises sensing means for sensing certain card fields for controlling entering operations in said accumulator, record card feeding means for feeding said record cards past said sensing means in succession, and means for positioning a plurality of different card fields of a record in succession to the sensing means at one station and then positioning a plurality of other different card fields of the same record card in succession to the sensing means at the other station comprising, at each station, a plurality of card stop means and sequentially operable means for controlling the related card stop means to control the feeding of the record card to position the card fields to be sensed at that station in succession to the sensing means thereat, whereby all of the fields of a common record are sensed in succession and the data represented thereby entered in the accumulator.

ROBERT E. PARIS.